(12) United States Patent
Albe

(10) Patent No.: US 6,998,431 B2
(45) Date of Patent: *Feb. 14, 2006

(54) POLYMERIZATION PROCESS

(75) Inventor: Lisa Albe, Isaac (BE)

(73) Assignee: Fina Technology, Inc., Houston, TX (US)

( * ) Notice: Subject to any disclaimer, the term of this patent is extended or adjusted under 35 U.S.C. 154(b) by 104 days.

This patent is subject to a terminal disclaimer.

(21) Appl. No.: 10/112,562

(22) Filed: Mar. 28, 2002

(65) Prior Publication Data
US 2003/0187130 A1 Oct. 2, 2003

(51) Int. Cl.
C08K 5/34 (2006.01)

(52) U.S. Cl. .................. 524/100; 524/102; 524/230

(58) Field of Classification Search ................ 524/100, 524/102, 230
See application file for complete search history.

(56) References Cited

U.S. PATENT DOCUMENTS

| 4,298,718 | A | 11/1981 | Mayr et al. |
|---|---|---|---|
| 4,480,092 | A | 10/1984 | Lai et al. |
| 4,544,717 | A | 10/1985 | Mayr et al. |
| 4,560,734 | A | 12/1985 | Fujishita et al. |
| 4,701,432 | A | 10/1987 | Welborn, Jr. |
| 4,767,735 | A | 8/1988 | Ewen et al. |
| 4,794,096 | A | 12/1988 | Ewen |
| 4,808,561 | A | 2/1989 | Welborn, Jr. |
| 4,892,851 | A | 1/1990 | Ewen et al. |
| 4,929,653 | A | 5/1990 | Kletecka et al. |
| 4,975,403 | A | 12/1990 | Ewen |
| 5,190,710 | A | 3/1993 | Kletecka |
| 5,243,002 | A | 9/1993 | Razavi |
| 5,272,003 | A | 12/1993 | Peacock |
| 5,308,811 | A | 5/1994 | Suga et al. |
| 5,318,734 | A | 6/1994 | Palmersten et al. |
| 5,354,795 | A | 10/1994 | Ueno et al. |
| 5,444,134 | A | 8/1995 | Matsumoto |
| 6,309,987 | B1 * | 10/2001 | Srinivasan ................ 442/147 |
| 6,723,769 | B1 * | 4/2004 | Miller et al. ............... 524/236 |

FOREIGN PATENT DOCUMENTS

CN 2178104 12/1996

OTHER PUBLICATIONS

Kirk-Othmer, Encyclopedia of Chemical Technology, 1983, pp. 615-627, vol. 23, John Wiley & Sons, N.Y.

* cited by examiner

Primary Examiner—Peter D. Mulcahy
(74) Attorney, Agent, or Firm—Madan, Mossman & Sriram, P.C.

(57) ABSTRACT

Process for the production of an alpha olefin polymer and a process for the treatment of the alpha olefin polymer. A polymerization feed containing an alpha olefin, such as propylene, is supplied to the reactor to produce a thermoplastic polymer product involving a homopolymer or a copolymer. A product stream containing the polymer is withdrawn from the polymerization reactor and the polymer product is recovered from the product stream. The polymer product is then processed to produce the polymer product in a granular or pelletized form. A hindered amine light stabilizer is oxidized with an oxidizing agent under conditions to convert at least a portion of the amine groups to nitroxyl groups. The oxidized hindered amine light stabilizer is then supplied to the polymer product prior to heating and processing of the polymer product.

15 Claims, 1 Drawing Sheet

POLYMERIZATION PROCESS

FIELD OF THE INVENTION

This invention relates to a method for the production of heat stabilized polyolefin polymers and more particularly to the treatment of propylene polymers including polypropylene homopolymers or copolymers of propylene and other olefinically unsaturated monomers which are stabilized against heat degradation during processing.

BACKGROUND OF THE INVENTION

Thermoplastic olefin polymers, such as linear polyethylene, polypropylene, and olefin copolymers, such as ethylene propylene copolymer, are conveniently formed in continuous loop-type polymerization reactors and thermoformed to arrive at granules or pellets of the polymers. For example, polypropylene and/or propylene/ethylene copolymers are polymerized in continuous polymerization reactors in which the monomer stream is introduced into a reactor and circulated with an appropriate catalyst to produce the olefin homopolymer or copolymer. The polymer is withdrawn from the catalyst reactor and subjected to appropriate processing steps and then extruded as a thermoplastic mass through an extruder and die mechanism to produce the polymer as a raw material in pelletized or granular form. During the subsequent processing steps, the polymer is subject to heat degradation with attendant undesirable consequences, such as discolorization of the polymer that is disadvantageous when the polymer pellets or granules are ultimately processed in the formation of the desired end product. In order to retard thermal degradation an antioxidant is incorporated into the polymer product stream early in the processing stage of the polymer after it is withdrawn from the polymerization reactor. In addition to thermal degradation due to the heat processing, thermoplastic polymers are also subject to degradation under application of electromagnetic radiation after they are molded or formed to their desired end-point use.

Polypropylene and propylene copolymers are widely used in various applications and production of films, fibers, and other formed products such as molded automobile parts. Such products may be colored or treated with pigments to arrive at a desired color, or they may be formed in transparent configurations, such as thin, transparent, polypropylene films. Polymers of this nature are subject to degradation due to photochemical action induced by electromagnetic radiation in the visible light range and in the ultraviolet region. In order to retard the degradation of such polymeric objects, the base polymer system, which is molded or extruded to form the desired object, e.g. fiber or film, may be treated with hindered amine light stabilizers, identified by the acronym "HALS," which function to protect the film, fiber, or other object against degradation due to electromagnetic radiation by radiation in the visible light spectrum. Such hindered amine light stabilizers (HALS) are in themselves well known in the art and have been used extensively to protect propylene homopolymers or copolymers against degradation due to irradiation with electromagnetic energy in the visible light spectrum in the presence of an oxidizing environment. Thus, U.S. Pat. No. 4,929,653 to Kletecka at al discloses the treatment of polypropylene used in making polypropylene fibers to be used in making yarn and fabric through the application of a hindered amine light stabilizers. The stabilizers are incorporated into the propylene in the course of the extrusion and spinning operation involved in the formation of the fibers. Disclosed in Kletecka are a wide variety of hindered amine light stabilizers containing as a portion of their basic structure a polysubstituted piperazine-2-one (PSP) moiety. The hindered amine light stabilizer can be incorporated into the propylene polymer at a suitable location in the process of manufacturing the fiber or other product. For example, in the manufacture of fiber that is then used to make multifilament yarn ultimately to be woven into a fabric, the stabilizer can be mixed with the polypropylene in the melt that is then spun into fiber. Alternatively, the stabilizer may be dissolved in a suitable solvent such as methylene chloride to solvent-blend the polypropylene powder. The solvent is then extracted by evaporation and the polypropylene containing the hindered amine light stabilizer is then extruded and pelletized before spinning it into the fiber filaments.

Another application of hindered amine light stabilizers is found in U.S. Pat. No. 5,354,795 to Ueno et al, which discloses the use of hindered amine light stabilizers in combination with anti-oxidants, thermal stabilizers, ultraviolet stabilizers and the like in formulating polypropylene resin compositions having good weathering characteristics, such as useful in automobile parts, such as bumpers and the like. In Ueno, the stabilizer is characterized as a hindered amine light stabilizer having a molecular weight of 500 or more or having a molecular weight of less than 500 and not have an Ni—H bond. Examples given in Ueno et al that hindered amine light stabilizers having a molecular weight of more than 500 include dimethyl succinate-1-(2-hydroxyethyl)-4-hydroxy-2,2-6,6-tetramethylpiperidine polycondensation product, 1,2,3,4-butanetetracarboxylic acid-2,2,6,6-tetrametehyl-4-piperidinol tridecyl alcohol condensation product, 1,2,3,4-butanetetracarboxylic acid-1,2,2,6,6-tetramethyl-4-piperidinol tridecyl alcohol condensation product, poly[[{6-(1,1,3,3-tetramethylbutyl)imino-1,3,5-triazine-2,4-diyl}-{2,2,6,6-tetramethyl-4-piperidyl-)imino}] hexamethylene {2,2,6,6-tetramethyl-4-piperidyl)imino}], 2-(3,5-di-tert-butyl-4-hydroxybenzyl)-2-n-butyl-malonic acid-bis(1,2,2,6,6-pentamethyl-4-piperidyl), tetrakis(2,2,6,6-tetramethyl-4-piperidyl)-1,2,3,4-butanetetra carboxylate, tetrakis(1,2,2,6,6-tetramethyl-4-piperidyl)-1,2,3,4-butanetetracarboxylate, bis(1,2,2,6,6-pentamethyl-4-piperidyl) sebacate, and 1-[2-[3-(3,5-di-tert-butyl-4-hydroxyphenyl)propionyloxy]ethyl]-4[3-(3,5-di-tert-butyl-4-hydroxyphenyl)propionyloxy]-2,2,6,6-tetramethylpiperidine. A hindered amine light stabilizer having a molecular weight of less than 500 and not having an N—H bond is identified as 8-benzyl-7,7,9,9-tetramethyl-3-octyl-1,3,8-triazaspiro[4,5]undecane-2,4-dione. In Ueno, the hindered amine light stabilizer can be blended with a powder or pellet of a polymer with a blend melt kneaded in a monoaxial or biaxial extruder.

Propylene polymers, into which HALS can be incorporated and which can be used in the formation of fibers, filaments, films, and molded articles, can take the form of highly crystalline polymer structures such as isotactic polypropylene and syndiotactic polypropylene. Isotactic polypropylene is one of a number of crystalline polymers that can be characterized in terms of the stereoregularity of the polymer chain. Various stereospecific structural relationships, characterized primarily in terms of syndiotacticity and isotacticity, may be involved in the formation of stereoregular polymers for various monomers. Stereospecific propagation may be applied in the polymerization of ethylenically-unsaturated monomers, such as $C_3$+alpha olefins, 1-dienes such as 1,3-butadiene, substituted vinyl compounds such as vinyl aromatics, e.g. styrene or vinyl chloride, vinyl chloride, vinyl ethers such as alkyl vinyl ethers, e.g. isobutyl vinyl ether, or even aryl vinyl ethers. Stereospecific polymer propagation is probably of most significance in the production of polypropylene of isotactic or syndiotactic structure.

Isotactic polypropylene is conventionally used in the production of fibers in which the polypropylene is heated and then extruded through one or more dies to produce a fiber preform which is processed by a spinning and drawing operation to produce the desired fiber product. The structure of isotactic polypropylene is characterized in terms of the methyl group attached to the tertiary carbon atoms of the successive propylene monomer units lying on the same side of the main chain of the polymer. That is, the methyl groups are characterized as being all above or below the polymer chain. Isotactic polypropylene can be illustrated by the following chemical formula:

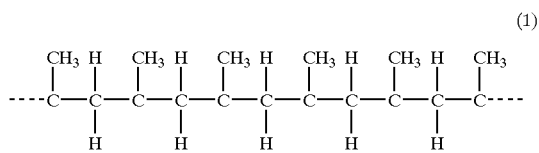

(1)

Stereoregular polymers, such as isotactic and syndiotactic polypropylene, can be characterized in terms of the Fisher projection formula. Using the Fisher projection formula, the stereochemical sequence of isotactic polypropylene, as shown by Formula (2), is described as follows:

(2)

Another way of describing the structure is through the use of NMR. Bovey's NMR nomenclature for an isotactic pentad is . . . mmmm . . . with each "m" representing a "meso" dyad, or successive methyl groups on the same side of the plane of the polymer chain. As is known in the art, any deviation or inversion in the structure of the chain lowers the degree of isotacticity and crystallinity of the polymer.

In contrast to the isotactic structure, syndiotactic propylene polymers are those in which the methyl groups attached to the tertiary carbon atoms of successive monomeric units in the polymer chain lie on alternate sides of the plane of the polymer. Using the Fisher projection formula, the structure of syndiotactic polypropylene can be shown as follows:

(3)

The corresponding syndiotactic pentad is rrrr with each r representing a racemic diad. Syndiotactic polymers are semi-crystalline and, like the isotactic polymers, are insoluble in xylene. This crystallinity distinguishes both syndiotactic and isotactic polymers from an atactic polymer, which is non-crystalline and highly soluble in xylene. An atactic polymer exhibits no regular order of repeating unit configurations in the polymer chain and forms essentially a waxy product. Catalysts that produce syndiotactic polypropylene are disclosed in U.S. Pat. No. 4,892,851. As disclosed there, the syndiospecific metallocene catalysts are characterized as bridged structures in which one Cp group is sterically different from the others. Specifically disclosed in the '851 patent as a syndiospecific metallocene is isopropylidene(cyclopentadienyl-1-fluorenyl) zirconium dichoride.

In most cases, the preferred polymer configuration will be a predominantly isotactic or syndiotactic polymer with very little atactic polymer. Catalysts that produce isotactic polyolefins are disclosed in U.S. Pat. Nos. 4,794,096 and 4,975,403. These patents disclose chiral, stereorigid metallocene catalysts that polymerize olefins to form isotactic polymers and are especially useful in the polymerization of highly isotactic polypropylene. As disclosed, for example, in the aforementioned U.S. Pat. No. 4,794,096, stereorigidity in a metallocene ligand is imparted by means of a structural bridge extending between cyclopentadienyl groups. Specifically disclosed in this patent are stereoregular hafnium metallocenes that may be characterized by the following formula:

(4)

In Formula (4), ($C_5$ ($R'$)$_4$) is a cyclopentadienyl or substituted cyclopentadienyl group, $R'$ is independently hydrogen or a hydrocarbyl radical having 1–20 carbon atoms, and $R''$ is a structural bridge extending between the cyclopentadienyl rings. Q is a halogen or a hydrocarbon radical, such as an alkyl, aryl, alkenyl, alkylaryl, or arylalkyl, having 1–20 carbon atoms and p is 2.

Metallocene catalysts, such as those described above, can be used either as so-called "neutral metallocenes" in which case an alumoxane, such as methylalumoxane, is used as a co-catalyst, or they can be employed as so-called "cationic metallocenes" which incorporate a stable non-coordinating anion and normally do not require the use of an alumoxane. For example, syndiospecific cationic metallocenes are disclosed in U.S. Pat. No. 5,243,002 to Razavi. As disclosed there, the metallocene cation is characterized by the cationic metallocene ligand having sterically dissimilar ring structures that are joined to a positively charged coordinating transition metal atom. The metallocene cation is associated with a stable non-coordinating counter-anion. Similar relationships can be established for isospecific metallocenes.

Catalysts employed in the polymerization of alpha-olefins may be characterized as supported catalysts or as unsupported catalysts, sometimes referred to as homogeneous catalysts. Metallocene catalysts are often employed as unsupported or homogeneous catalysts, although, as described below, they also may be employed in supported catalyst components. Traditional supported catalysts are the so-called "conventional" Ziegler-Natta catalysts, such as titanium tetrachloride supported on an active magnesium dichloride, as disclosed, for example, in U.S. Pat. Nos. 4,298,718 and 4,544,717, both to Myer et al. A supported catalyst component, as disclosed in the Myer '718 patent, includes titanium tetrachloride supported on an "active" anhydrous magnesium dihalide, such as magnesium dichloride or magnesium dibromide. The supported catalyst component in Myer '718 is employed in conjunction with a co-catalyst such and an alkylaluminum compound, for example, triethylaluminum (TEAL). The Myer '717 patent discloses a similar compound that may also incorporate an electron donor compound that may take the form of various amines, phosphenes, esters, aldehydes, and alcohols.

While metallocene catalysts are generally proposed for use as homogeneous catalysts, it is also known in the art to provide supported metallocene catalysts. As disclosed in U.S. Pat. Nos. 4,701,432 and 4,808,561, both to Welborn, a metallocene catalyst component may be employed in the form of a supported catalyst. As described in the Welborn '432 patent, the support may be any support such as talc, an inorganic oxide, or a resinous support material such as a polyolefin. Specific inorganic oxides include silica and alumina, used alone or in combination with other inorganic oxides such as magnesia, zirconia and the like. Non-metallocene transition metal compounds, such as titanium tetrachloride, are also incorporated into the supported catalyst component. The Welborn '561 patent discloses a heterogeneous catalyst that is formed by the reaction of a metallocene and an alumoxane in combination with the support material. A catalyst system embodying both a homogeneous metallocene component and a heterogeneous component, which may be a "conventional" supported Ziegler-Natta catalyst, e.g. a supported titanium tetrachloride, is disclosed in U.S. Pat. No. 5,242,876 to Shamshoum et al. Various other catalyst systems involving supported metallocene catalysts are disclosed in U.S. Pat. No. 5,308,811 to Suga et al and U.S. Pat. No. 5,444,134 to Matsumoto.

The polymers normally employed in the preparation of drawn polypropylene fibers are normally prepared through the use of conventional Ziegler-Natta catalysts of the type disclosed, for example, in the aforementioned patents to Myer et al. U.S. Pat. No. 4,560,734 to Fujishita and U.S. Pat. No. 5,318,734 to Kozulla disclose the formation of fibers by heating, extruding, melt spinning, and drawing from polypropylene produced by titanium tetrachloride-based isotactic polypropylene. Particularly, as disclosed in the patent to Kozulla, the preferred isotactic polypropylene for use in forming such fibers has a relatively broad molecular weight distribution (abbreviated MWD), as determined by the ratio of the weight average molecular weight ($M_w$) to the number average molecular ($M_n$) of about 5.5 or above. Preferably, as disclosed in the Kozulla patent, the molecular weight distribution, $M_w/M_n$, is at least 7.

It is also known to produce polypropylene-based fibers from syndiotactic polypropylene. Thus, as disclosed in U.S. Pat. No. 5,272,003 to Peacock, syndiotactic polypropylene, such as that produced by syndiospecific metallocenes of the type disclosed in the aforementioned U.S. Pat. No. 4,892,851, can be used to produce polypropylene fibers using various techniques disclosed therein and identified as melt spinning, solution spinning, flat film spinning, blown film, and melt blowing or spun bond procedures. As disclosed in Peacock, the syndiotactic polypropylene, as characterized by polymer configuration, comprises racemic diads connected predominantly by meso triads. As noted in Peacock, the syndiotactic polypropylene fibers may be in the form of continuous filament yarn, monofilaments, staple fiber, tow, or top. Syndiotactic fibers, as thus produced, are characterized as having substantially greater retraction value than fibers formed of isotactic polypropylene. This enhanced elasticity is said to form an advantage of the syndiotactic polypropylene fibers over isotactic polypropylene fibers for use in garments, carpets, tie downs, towropes, and the like.

SUMMARY OF THE INVENTION

In accordance with the present invention there is provided a process for the production of an alpha olefin polymer and a process for the treatment of the alpha olefin polymer. In carrying out the invention, a polymerization reactor is operated for the reaction of an alpha olefin, such as propylene, supplied to the reactor to produce a thermoplastic polymer product involving a homopolymer or a copolymer. A product stream containing the polymer product is withdrawn from the polymerization reactor and the desired polymer product is recovered from the product stream. The polymer product is then processed to produce the polymer product in a granular or pelletized form. A hindered amine light stabilizer is oxidized with an oxidizing agent under conditions to convert at least a portion of the amine groups to nitroxyl groups. The oxidized hindered amine light stabilizer is then supplied to the polymer product prior to heating and processing of the polymer product.

BRIEF DESCRIPTION OF THE DRAWINGS

The drawing is a schematic illustration of a process implementing the present invention.

DETAILED DESCRIPTION OF THE INVENTION

Figure 1:
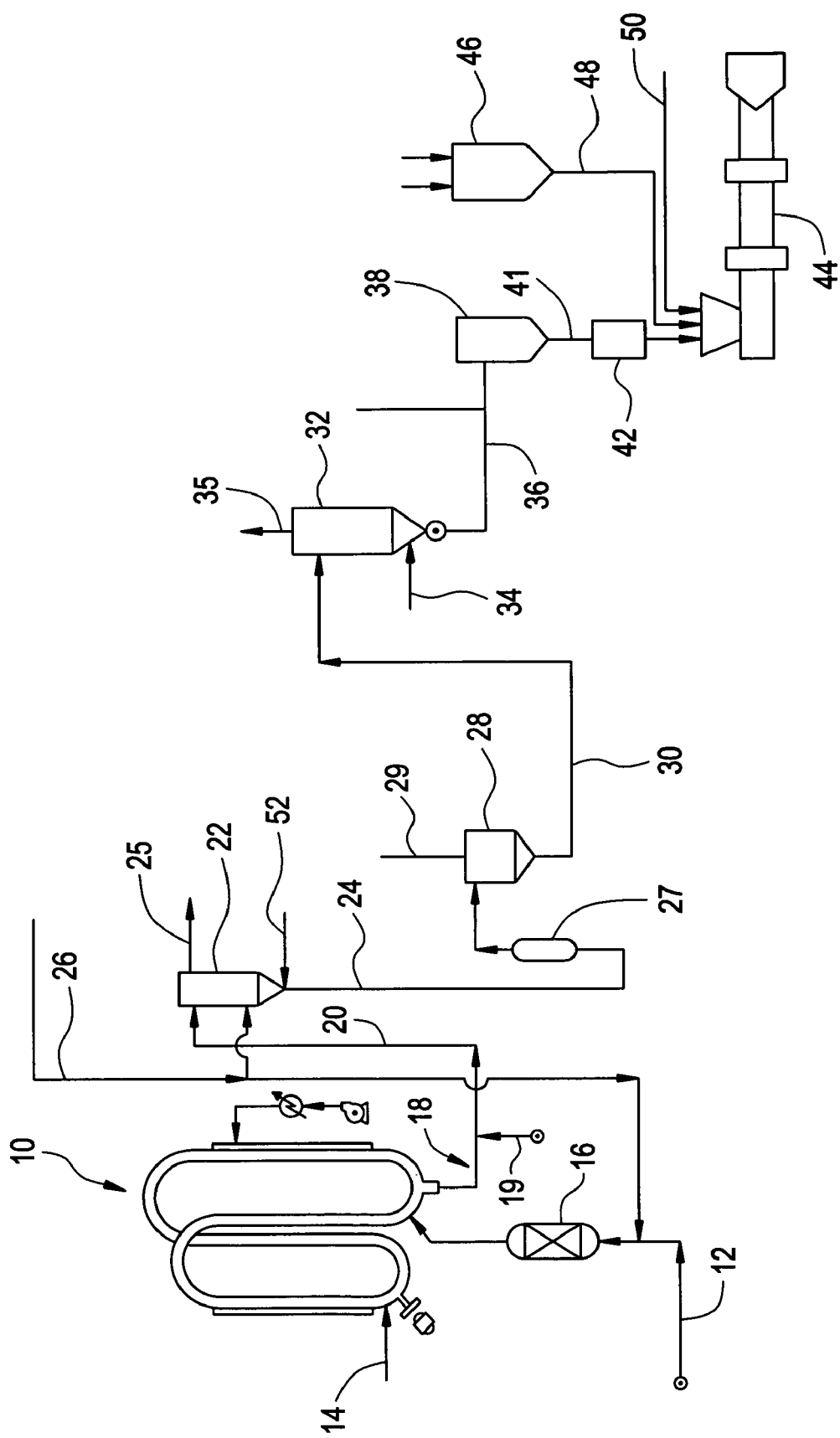

The present invention involves the use of a hindered amine light stabilizer at a critical point in the formation of a propylene polymer product and in a manner in which the HALS is partially oxidized prior to introduction into the propylene polymer. The invention will be described with reference to a loop-type reactor used in the production of stereoregular polypropylene, specifically isotactic polypropylene, although it will be recognized that the invention may be carried out with respect to syndiotactic polypropylene or other propylene polymers or copolymers that may incorporate other olefin polymers such as polyethylene. Referring to FIG. 1, there is illustrated a loop-type polymerization reactor 10 which is supplied with propylene monomer through an input line 12 and a catalyst system through an input line 14. The continuous loop-type reactor is, as will be understood by those skilled in the art, equipped with an impeller (not shown) which functions to circulate the polymerization reaction mass continuously through the loop-type reactor under controlled temperature and pressure conditions. The propylene input line 12 is equipped with a drying chamber 16 in which the propylene feed stream is dehydrated to a suitable low water level. By way of example, the chamber 16 may be filled with a desiccant to reduce the water content of the propylene supplied to the reactor to a suitable value. The polymerization reactor may be operated under any suitable conditions. Liquefied propylene preferably is used as the carrier medium in the course of the polymerization reaction within reactor 10. Alternatively, an inert solvent such as hexane can be used.

A catalyst system which may take the form of a conventional Ziegler-Natta catalyst system or a metallocene-based catalyst system of the types described previously is incorporated into the polymerization reactor through catalyst feed line 14 in which the catalyst components are prepolymerized with a small amount of propylene monomer before being introduced into the catalyst system. For example, the catalyst may take the form of supported titanium tetrachloride supported on an activated magnesium dichloride or dibromide employed in conjunction with a co-catalyst, such as triethylaluminum, and an electron donor, such as diphenyldimethoxysilane (DPMS). In the prepolymerization injection system a carrier solvent, such as hexane or heptane, is mixed with the co-catalyst and electron donor and then mixed with the supported titanium tetrachloride catalyst (or another Ziegler-Natta catalyst) and then incorporated into the reactor via line 14. The catalyst may be supplied either continuously or intermittently to the carrier stream for inclusion into the reactor. Preferably, the catalyst is prepolymerized in a tubular reactor operated under a relatively short residence time as disclosed in U.S. Pat. No. 4,767,735 to Ewen et al. For a further description of suitable prepolymerization time, reference is made to the aforementioned U.S. Pat. No. 4,767,735, the entire disclosure of which is incorporated herein by reference.

A suitable Ziegler-Natta catalyst can take the form of a heterogeneous titanium tetrachloride supported on an activated support. Metallocene catalyst systems that may be either homogeneous or heterogeneous can also be employed in carrying out the present invention. In the production of isotactic polypropylene, bridged metallocene catalyst systems of the type disclosed in the aforementioned U.S. Pat. Nos. 4,794,096 and 4,975,403 may be employed. Similarly, the catalyst system used in producing the isotactic polypropylene could take the form of supported metallocene catalyst as disclosed in the aforementioned U.S. Pat. Nos. 4,701,432 and 4,808,561. Hybrid catalyst systems employing both metallocene-based catalysts and supported titanium tetrachloride-based catalysts, such as disclosed in the aforementioned U.S. Pat. No. 5,248,876, may also be employed. In addition, where it is desired to form a syndiotactic polypropylene catalyst system, such as disclosed in the aforementioned U.S. Pat. Nos. 4,892,851 and 5,243,002 may be introduced into the loop-type reactor.

At the product side of the reactor, the propylene polymer is withdrawn via line 18. Typically, a deactivator, such as isopropyl alcohol, is incorporated into the product stream in order to terminate the polymerization reaction in the solvent stream containing the polypropylene. The deactivator is applied via line 19 to line 18. The product stream is then supplied via line 20 to a washing column 22 from which polypropylene fluff is extracted through line 24. Propylene is also recovered from column 22 via propane recovery line 25 and applied through a suitable purification and recovery system (not shown) and recirculation via line 26 for reuse in the polymerization reactor 10. The product stream containing the polypropylene fluff is passed through a heater 27 and then to a flash tank 28 where the propylene in the feed stream is expanded and taken off as a gas via line 29. The propylene gas from line 29 is applied to a recovery system for reuse in the process similarly as described above. The product stream withdrawn from flash tank 28, which now contains only very small quantities of gaseous propylene, is applied through line 30 to a purge column 32. In purge column 32, gaseous nitrogen is introduced via line 34 in a countercurrent flow with the product stream and the nitrogen containing any residual propylene gas is withdrawn via line 35. The product stream, which is now free of gaseous propylene, is withdrawn from the bottom of the purge column via line 36.

The product stream 36 from the purge column is applied to a silo 38 which functions something in the nature of a surge tank to provide a product stream to an extruder system in which polymer pellets are formed. The product withdrawn from the surge tank is passed via line 41 to a heater 42 where it is heated to a suitable temperature within the range of 300–600° F., usually about 400–500° F., and supplied to an extruder-die system 44. At this stage of the processing, dry additives that are used in the final polymer product are added via a feed hopper 46 and gravity feed line 48. Liquid additives may be supplied through line 50. In the extruder die system, the polymer is extruded and then cut into appropriate particles. Typically, a polypropylene product may be extruded and die cut into pellets of about ⅛" in diameter and about ¼" long. These products may then be heated and extruded in various applications, such as in the production of films or fibers or in the production of molded articles, such as automobile components and the like.

From the foregoing description, it will be recognized that much of the processing of polypropylene or other thermoplastic polymers can be carried out at elevated temperatures, ranging as high as 600° F. These high processing temperatures can induce deterioration of the polymer product. In the case of polypropylene, at these high temperatures, the polymer can undergo thermal degradation resulting in undesirable properties, such as a decrease in molecular weight and melt viscosity and an increase in the melt flow index.

In order to retard such thermal degradation of the polymer product, one solution involves the introduction of a thermal stabilizer into the polypropylene product stream as it leaves the wash column 22. Conventionally used stabilizers can take the form of phenolic anti-oxidants and various processing stabilizers such as phosphites and phosphonites. One such stabilizer that has been successfully employed is a 15 wt. % solution of octydecal-3-5-tert-butyl-4-hydroxynitrosuccinimide, available under the trademark Irganox 1076, in a suitable solvent carrier such as hexane. The present invention proceeds in another direction through the use of hindered amine light stabilizers that are pre-oxidized and introduced in the process in lieu of a conventionally used stabilizer. Specifically in this aspect of the invention, a suitable hindered amine light stabilizer is pre-oxidized with a suitable oxidant and then introduced into the product stream leaving the wash column 22 by means of an injection line 52. As discussed below, numerous oxidizers and HALS components may be used in carrying out the invention. Preferably, the products used at this stage of the invention have FDA approval for use in food product packaging, since one widely used application of polypropylene is in the production of biaxially-oriented films, which are used as transparent wrapping for food products. A suitable oxidant having FDA approval that may be used in carrying out the present invention is 2,5-dimethyl-2,5-ditert(butyl peroxy) hexane. A suitable oxidant of this nature is commercially available under the designation Lubrisol 101.

The hindered amine light stabilizers employed in carrying out the present invention may be of any suitable type such as described in the aforementioned patents to Kletecka et al and Ueno et al. The HALS components may be described as bridged heterocyclic amines having at least one, and in most cases a plurality, of heterocyclic amino groups. HALS components suitable for use in carrying out the present invention may be characterized by the following structural formulas:

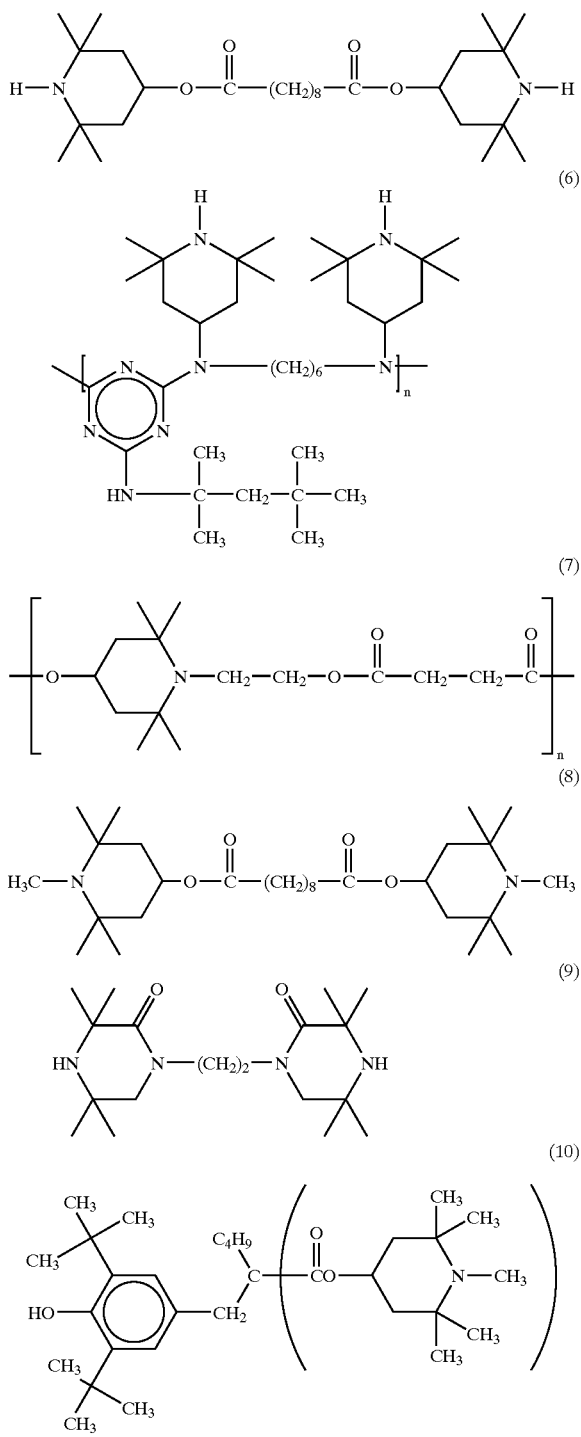

In each of the compounds indicated by Formulas 5–9 above the symbol "\" indicates an alkyl substituent in which each independently has one or two carbon items, i.e. a methyl group or an ethyl group. In the compounds depicted by Formulas 6 and 7, the value of n may be selected in order to provide a molecular weight for the HALS component.

In the preferred and commercially available HALS components depicted by Formulas 5–9, the substituent groups \ are methyl groups, and such materials are commercially available from Ciba-Geigy Corporation under the designations "Tinuvin 770" (Formula 5), "Chimassorb 944" (Formula 6), "Tinuvin 622" (Formula 7), and "Tinuvin 292" (Formula 8). A commercial HALS of Formula 9, in which the substituents \ are alkyl groups, is available from B. F. Goodrich under the designation "Good-rite UV3032," and the hindered amine depicted by Formula 10 is available from Ciba-Geigy Corporation under the designation "Tinuvin 144."

While the hindered amines depicted by compounds 5–10 above are preferred in carrying out the present invention, it will be recognized that numerous other HALS compounds incorporated a heterocyclic amino group are also well known in the art, and for description of such compounds, reference is made to U.S. Pat. No. 4,480,092 to Lai et al and U.S. Pat. No. 5,190,710 to Kletecka and the aforementioned mentioned U.S. Pat. No. 4,929,653 to Kletecka et al and U.S. Pat. No. 5,354,795 to Ueno et al, the entire disclosures of which are incorporated herein by reference.

The oxidizing agent used in carrying out the present invention may be any suitable oxidizing agent which is compatible with the HALS component and which is effective to oxidize at least a portion of the amine groups in the HALS component to nitroxyl groups. As noted previously, an oxidant, such as Lubrisol 101, having FDA approval for food products will usually be preferred.

The amount of preoxidized HALS, which is introduced into the product stream, preferably is such as to provide a concentration of the preoxidized HALS in the product stream. Greater amounts can be used, although it usually will be preferred to maintain the preoxidized HALS level in the product stream at 1,000 ppm or less, an exception to this limit may be observed where it is desirable to incorporate sufficient preoxidized HALS into the product so that it can function in a more traditional role as an additive to retard photochemical degeneration of the polymer product. That is, rather than employ an hindered amine light stabilizer in the conventional sense by adding the product to the polypropylene as it is remelted and processed to form a film, fiber, or other product, sufficient HALS can be added via line 50 in the processing plant to provide a residual amount suitable for stabilizing the product against color degradation. Here, the preoxidized HALS performs two functions, one to guard against thermal degradation in the course of processing in accordance with the present invention and the other, to provide a more traditional effect of color stabilization and the like.

The preoxidized HALS component can be introduced into the polymer product stream with some effectiveness at any point after withdrawal from the polymerization reactor and prior to heating and extruding the polymer fluff. The HALS component should be introduced subsequent to introduction of the deactivator immediately downstream of the withdrawn point from the polymerization reactor. Subject to this condition, the HALS component preferably is introduced into the product stream at an early stage of the processing step. Preferably, it is introduced at a stage where most of the propylene has been eliminated from the product stream, and for this reason, it is introduced most preferably promptly at the effluent end of the wash column 22.

The HALS component and the oxidizing component typically are mixed together for a suitable period of time to effect the desired oxidation of a substantial portion of the amine groups in the HALS component to nitroxy groups. The HALS components used in the present invention preferably are treated with a stoichiometric amount of oxidant sufficient to convert at least some of the amino groups in the HALS to nitroxy groups. The functioning of HALS stabilizers inhibiting against degradation of polymer products under electromagnetic radiation is described in Kirk-Othmer, *Encyclopedia of Chemical Technology*, Third Edition, Vol. 23, pp. 615–627, the entire disclosure of which is incorporated herein by reference. As described there, HALS stabilizers function as stabilizers against electromagnetic radiation in the visible light and ultraviolet region both by the function of the hindered amine and its oxidation product functioning as scavengers for alkyl radicals and carboxyl groups that exhibit a destabilizing effect. Thus, in the normal use of hindered amine light stabilizers, as described above, to stabilize products such as fibers and the like the HALS is employed with anti-oxidants such as disclosed in the aforementioned patent to Ueno et al. The process of the present invention employs the HALS component in a directly contrary fashion that involves pre-oxidation of the component. Further, the HALS component, as described above, is added in the processing of the polypropylene withdrawn from the polymerization reactor rather than to the polypropylene during processing to produce the desired product, such as a film or fiber product.

Having described specific embodiments of the present invention, it will be understood that modifications thereof may be suggested to those skilled in the art, and it is intended to cover all such modifications as fall within the scope of the appended claims.

What is claimed is:

1. In the production and treatment of an alpha olefin polymer, the process comprising:
    a. operating a polymerization reactor for the reaction of an alpha olefin supplied to said reactor to produce a thermoplastic polymer product comprising a homopolymer or copolymer of said alpha olefin;
    b. withdrawing a product stream containing said therimoplastic polymer product from said polymerization reactor;
    c. supplying an oxidized hindered amine light stabilizer which is effective to retard thermal degradation and the degeneration of said polymer product in the presence of electromagnetic variation in the visible light or ultraviolet range oxidizing said hindered amine light stabilizer being the product of admixing an oxidizing agent with a hindered amine light stabilizer under conditions effective to convert at least a portion of the amine groups in said hindered amine light stabilizer to nitroxyl groups;
    d. recovering said polymer product from said product stream; and
    e. heating said recovered polymer product and thereafter processing said heated polymer product to produce said polymer product in a granular or pelletized form.

2. The process of claim 1 wherein said alpha olefin comprises ethylene.

3. The process of claim 2 wherein said thermoplastic polymer product comprises linear polyethylene.

4. The process of claim 1 wherein said alpha olefin comprises propylene.

5. The process of claim 4 wherein said propylene polymer is propylene homopolymer.

6. The process of claim 5 wherein said propylene homopolymer is a stereoregular polypropylene.

7. The process of claim 1 further comprising the step of subsequent to withdrawing said product stream in paragraph (b) and prior to the supply of said hindered amine light stabilizer in step (c), supplying a deactivator to said product stream to retard the continued polymerization reaction of said alpha olefin.

8. The process of claim 7 further comprising the step, prior to supplying said oxidized hindered amine light stabilizer in paragraph (c), of recovering unreacted alpha olefin monomer from said product stream.

9. In a process for the treatment of a propylene polymer, the process comprising:
    a. operating a polymerization reactor for the reaction of propylene supplied to said reactor to produce a propylene polymer fluff;
    b. withdrawing a product stream containing unreacted propylene and said propylene polymer fluff from said polymerization reactor;
    c. supplying a polymerization deactivator to said product stream; and
    d. providing an oxidized hindered amine light stabilizer which is effective to retard thermal degradation and the degeneration of said propylene polymer in the presence of electromagnetic variation in the visible light or ultraviolet range wherein the oxidized hindered amine light stabilizer is the product admuixing a hindered amine light stabilizer with an oxidizing agent under conditions effective to convert at least a portion of the amine groups in said hindered amine light stabilizer to nitroxyl groups.

10. The process of claim 9 further comprising, prior to the supply of said oxidized amine light stabilizer in paragraph (d), separating a portion of unreseted polypropylene from said product stream.

11. The process of claim 10 further comprising, subsequent to the supply of said oxidized hindered amine light stabilizer in paragraph (d), heating said product stream and thereafter separating an additional portion of unreacted polypropylene from said heated product stream.

12. In a process for the treatment of a propylene polymer, the steps comprising:
    a. operating a polymerization reactor for the reaction of propylene supplied to said reactor to produce a propylene polymer fluff;
    b. withdrawing a product stream containing unreacted propylene and said propylene polymer fluff from said polymerization reactor;
    c. separation at least a portion of said unreacted propylene from said product stream;
    d. providing an oxidized hindered amine light stabilizer which is effective to retard thermal degradation and the degeneration of said-propylene polymer fluff containing product stream in the presence of electromagnetic variation in the visible light or ultraviolet range wherein the oxidized hindered amine light stabilizer is the product admixing a hindered amine light stabilizer with an oxidizing agent under conditions effective to convert at least a portion of the amine groups in said hindered amine light stabilizer to nitroxyl groups.

13. The process of claim 12 wherein said propylene polymer fluff comprises a stereoregular polypropylene homopolymer or a copolymer of stereoregular polypropylene and another alpha olefin.

14. The process of claim 12 further comprising, subsequent to the supply of said oxidized hindered amine light stabilizer, heating said product stream and thereafter separating additional unreacted polypropylene from said product stream.

15. The process of claim 14 wherein said hindered amine light stabilizer is selected from the group consisting of secondary and tertiary amino groups and mixtures thereof.

* * * * *